(12) United States Patent
Xu et al.

(10) Patent No.: US 12,398,925 B2
(45) Date of Patent: Aug. 26, 2025

(54) GEOTHERMAL HEAT EXCHANGER

(71) Applicant: University of the District of Columbia, Washington, DC (US)

(72) Inventors: Jiajun Xu, Silver Spring, MD (US); Takele Gemeda, Washington, DC (US)

(73) Assignee: University of the District of Columbia, Washington, DC (US)

( * ) Notice: Subject to any disclaimer, the term of this patent is extended or adjusted under 35 U.S.C. 154(b) by 405 days.

(21) Appl. No.: 17/716,264

(22) Filed: Apr. 8, 2022

(65) Prior Publication Data
US 2022/0333826 A1 Oct. 20, 2022

Related U.S. Application Data

(60) Provisional application No. 63/172,117, filed on Apr. 8, 2021.

(51) Int. Cl.
*F24T 10/17* (2018.01)
*B33Y 80/00* (2015.01)
*F25B 30/06* (2006.01)

(52) U.S. Cl.
CPC .............. *F24T 10/17* (2018.05); *F25B 30/06* (2013.01); *B33Y 80/00* (2014.12)

(58) Field of Classification Search
CPC . F24T 10/10; F24T 10/17; F25B 30/06; F25B 2313/002; B33Y 80/00
See application file for complete search history.

(56) References Cited

U.S. PATENT DOCUMENTS

2010/0200192 A1* 8/2010 Consigny ................ F24T 10/17
165/45
2016/0209083 A1* 7/2016 Yu ........................... F24T 10/10

FOREIGN PATENT DOCUMENTS

JP 2011122784 A * 6/2011

OTHER PUBLICATIONS

JP 2011122784 translation.*

* cited by examiner

*Primary Examiner* — Elizabeth J Martin
(74) *Attorney, Agent, or Firm* — Whiteford, Taylor & Preston, LLP; Peter J. Davis; Gregory M. Stone

(57) ABSTRACT

A one-piece, unitarily formed compact geothermal heat exchanger comprises a one-piece body having an external screw-type configuration including a cutting tip and a spiral thread extending from the cutting tip upwards towards the top of the body of the heat exchanger. The top face of the body includes a working fluid inlet and a working fluid outlet, each of which are in communication with an internal continuous helical channel inside of the one-piece body through which the working fluid travels during operation to transfer heat energy between the working fluid and the ground. A compact geothermal heat exchanger having such configuration may be installed by screwing the heat exchanger into the ground to the desired depth, without digging or other excavation of the ground surface, and may be connected to a conventional geothermal heating and cooling system for geothermal heating and/or cooling of a space.

16 Claims, 6 Drawing Sheets

GEOTHERMAL HEAT EXCHANGER

CROSS REFERENCE TO RELATED APPLICATIONS

This application is based upon and claims the benefit of U.S. Provisional Application No. 63/172,117 titled "Compact Additively Manufactured Geothermal Heat Exchanger," filed with the United States Patent & Trademark Office on Apr. 8, 2021, the specification of which is incorporated herein by reference in its entirety.

FIELD OF THE INVENTION

This invention is directed to heat exchangers and systems employing heat exchangers, and more particularly to a geothermal heat exchanger and system employing such a geothermal heat exchanger that is formed as a unitary, one-piece assembly through an additive manufacturing process, which assembly is configured for direct insertion into land surfaces.

BACKGROUND OF THE INVENTION

Effective system energy management is critical for a range of increasingly complex systems and missions. Different industries and agencies seek technologies to use energy more efficiently in various applications, and thereby increase system energy efficiencies in future advanced energy systems. Wind power and solar power systems have become part of common knowledge and conversation over the past few years. While those technologies provide sustainable options of energy production, geothermal energy systems are just as efficient and economical and may provide certain advantages over wind and solar power systems. For example, solar and wind energy collectors are site specific, whereas geothermal systems do not take up buildable ground level space and they are neither location nor climate specific. The earth has a generally constant temperature throughout the year, which can be used in geothermal systems to benefit all sites.

Ground-source energy (GSE) is an environmentally benign alternative to non-renewable energy and a cost-effective way to manage electricity, heating, and cooling needs. Ground-source energy (GSE) exists in three levels (high, medium, and low) based on the quality of energy present in the ground. High-quality GSE resources generate electricity; medium-quality GSE resources provide energy for direct heating; finally, low-quality GSE resources can be used for indirect heating and cooling.

One such lower quality GSE resource comprises ground-source heat pumps. Among the different kinds of heat pumps used for heating and cooling of buildings, ground-source heat pumps (GSHPs), also known as geothermal heat pump systems or geo-exchange systems, represent a new modern and prospective technology. In a GSHP system, heat is extracted from or rejected to the ground via a GSHP through which pure water or anti-freezing solution circulates. Such GSHP systems function by tapping into the renewable solar energy stored in the ground to provide savings of up to 72% on heating and cooling costs.

Although such systems operate similarly to a standard heat pump, GSHP systems exchange heat with the earth instead of the outdoor air. More particularly, such GSHP systems extract heat energy from soil and transfer the heat energy from the soil into a residential or commercial building and thereby heat the building in cool ambient conditions. Such GSHP systems may also be used to transfer heat from the building to the soil, thereby cooling the building during periods of high ambient heat. Such systems may offer advantages over other heating and cooling mechanisms, such as the fact that no combustion is involved, there is no emission of potentially dangerous greenhouse gases, and there is no use of hazardous chemicals and/or refrigerants.

Nonetheless, previously known GSHP systems also have associated challenges. While efforts have been made in recent years to improve thermal performance of GSHP systems, a significant cost is associated with their installation in the soil. Various methods currently in use include boring a hole in the soil and inserting a geothermal heat exchanger into the bore hole. The bore hole may further be filled in with grout. Other methods for installing such geothermal heat exchangers include digging a trench, laying the heat exchanger in the trench and then backfilling the trench. Those systems employ tubing installed into the ground so that the refrigerant of the system may transfer the heat energy between the system (and the building to which it is connected) and the ground through a thermodynamic process. Such systems pose a fairly complex installation process and occupy large spaces that can potentially be cost-prohibitive to many potential users. Thus, known GSHP systems continue to suffer from the large spaces required for their installation, costly excavation of the soil at the location at which the system is to be installed in the ground, all in addition to costly maintenance.

Therefore, there remains a need in the art for GSHP systems that are of a more simplistic design, easier to install, and more compact in size than what has previously been available.

SUMMARY OF THE INVENTION

Disclosed herein is a geothermal heat exchanger and a geothermal heat pump system that avoids one or more disadvantages of prior art systems. A one-piece, unitarily formed compact geothermal heat exchanger is provided having a minimal occupying space to eliminate the need for excavation of the soil and the installation of long piping, as has been required by previously known geothermal systems, and that reduces the risk of working fluid leaking into the ground. Such a one-piece, unitary construction of a compact geothermal heat exchanger may be formed through additive manufacturing, which employs a computer-controlled method that generates three-dimensional objects by depositing materials, and is particularly suitable for forming complex parts. The additive manufacturing process offers a higher level of manufacturability, mechanical stability and integrity while reducing the cost of production over traditional manufacturing methods.

Using additive manufacturing, a one-piece, unitarily formed compact heat exchanger in accordance with aspects of the invention may be produced through, by way of non-limiting example, a direct metal laser sintering (DMLS) method, which builds the metal component from a CAD file using a laser to selectively fuse a fine metal powder. The compact geothermal heat exchanger is built layer by layer using a high-power laser to weld a thin layer of powdered metal. After each layer is complete, more metal powder is transferred to the top of the part's last layer, and the new powder layer is welded to the existing solidified material using the laser. This process repeats until the one-piece, unitary compact geothermal heat exchanger is built up to its final height.

A one-piece, unitarily formed compact geothermal heat exchanger formed in accordance with aspects of the invention provides a minimal occupying space, which can eliminate the need for excavation of the soil and installation of long piping as conventionally required for previously known geothermal systems. Further, an additively manufactured geothermal heat exchanger formed in accordance with aspects of the invention may reduce the risk of leakage of the working fluid into the ground, which further assists in alleviating potential environmental consequences. Still further, an additively manufactured geothermal heat exchanger formed in accordance with aspects of the invention may be simply integrated with conventional geothermal heating and cooling systems for improved efficiency and easy installation.

In an exemplary configuration, a one-piece, unitarily formed compact geothermal heat exchanger comprises a one-piece body having an external drill bit configuration including a cutting tip and a spiral thread extending from the cutting tip upwards towards the top of the body. The top face of the body includes a working fluid inlet and a working fluid outlet, each of which are in communication with an internal continuous helical channel inside of the one-piece body through which the working fluid travels during operation to transfer heat energy between the working fluid and the ground. A compact geothermal heat exchanger having such configuration may be easily installed by simply screwing the heat exchanger into the ground to the desired depth, without requiring prior digging or other excavation of the ground surface. The compact geothermal heat exchanger may then be connected to a conventional geothermal heating and cooling system for geothermal heating and/or cooling of a space, such as the interior of a building.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 2:
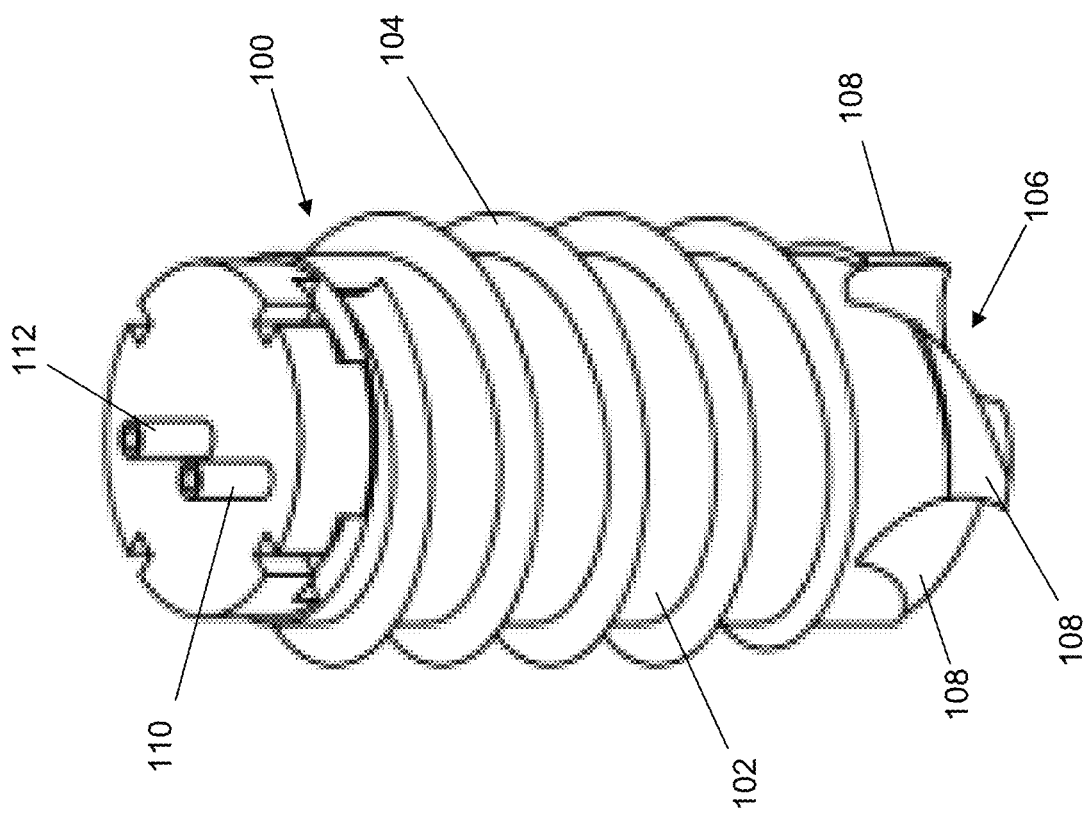
FIG. 2 is a perspective view of the one-piece, unitarily formed compact geothermal heat exchanger of FIG. 1.
Figure 1:
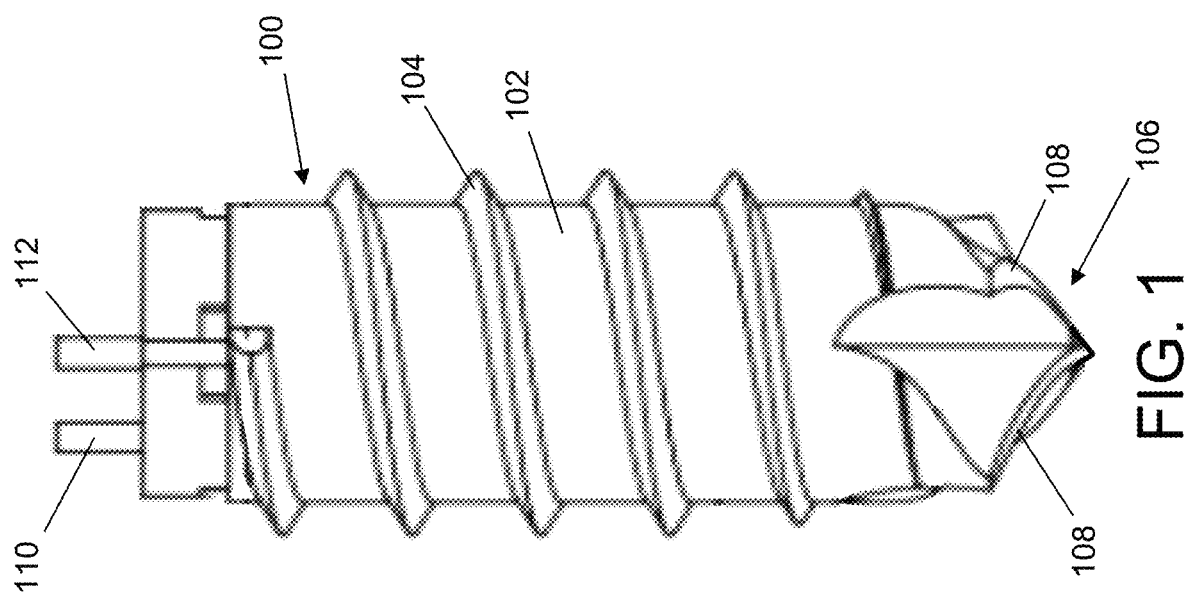
FIG. 1 is a side view of a one-piece, unitarily formed compact geothermal heat exchanger in accordance with certain aspects of an embodiment of the invention.

In accordance with certain aspects of an embodiment, a one-piece, unitarily formed compact geothermal heat exchanger is shown in FIGS. 1 and 2 generally at 100. Geothermal heat exchanger 100 includes a unitary, single-body and one-piece shaft 102, with helical threads 104 wrapping around the shaft 102 from a top of shaft 102 to the bottom of shaft 102. A cutting tip 106 is formed at the bottom of heat exchanger 100 having the configuration of a cutting tip on a drill bit, including a plurality of, and preferably four, flanks 108. Cutting tip 106 and helical threads 104 enable easy placement of heat exchanger 100 into the ground via a simple screw-in installation into the ground, without requiring prior excavation of the site for heat exchanger 100. Each of a working fluid inlet 110 and a working fluid outlet 112 is provided in the top of heat exchanger 100, which inlet 100 and outlet 112 provide access to a working fluid flow channel 114 (shown in FIG. 3 and discussed in greater detail below) the extends downward through shaft 102 to transfer heat energy between a working fluid flowing through working fluid flow channel 114 and the surrounding ground in a geothermal thermodynamic process.

Figure 11:
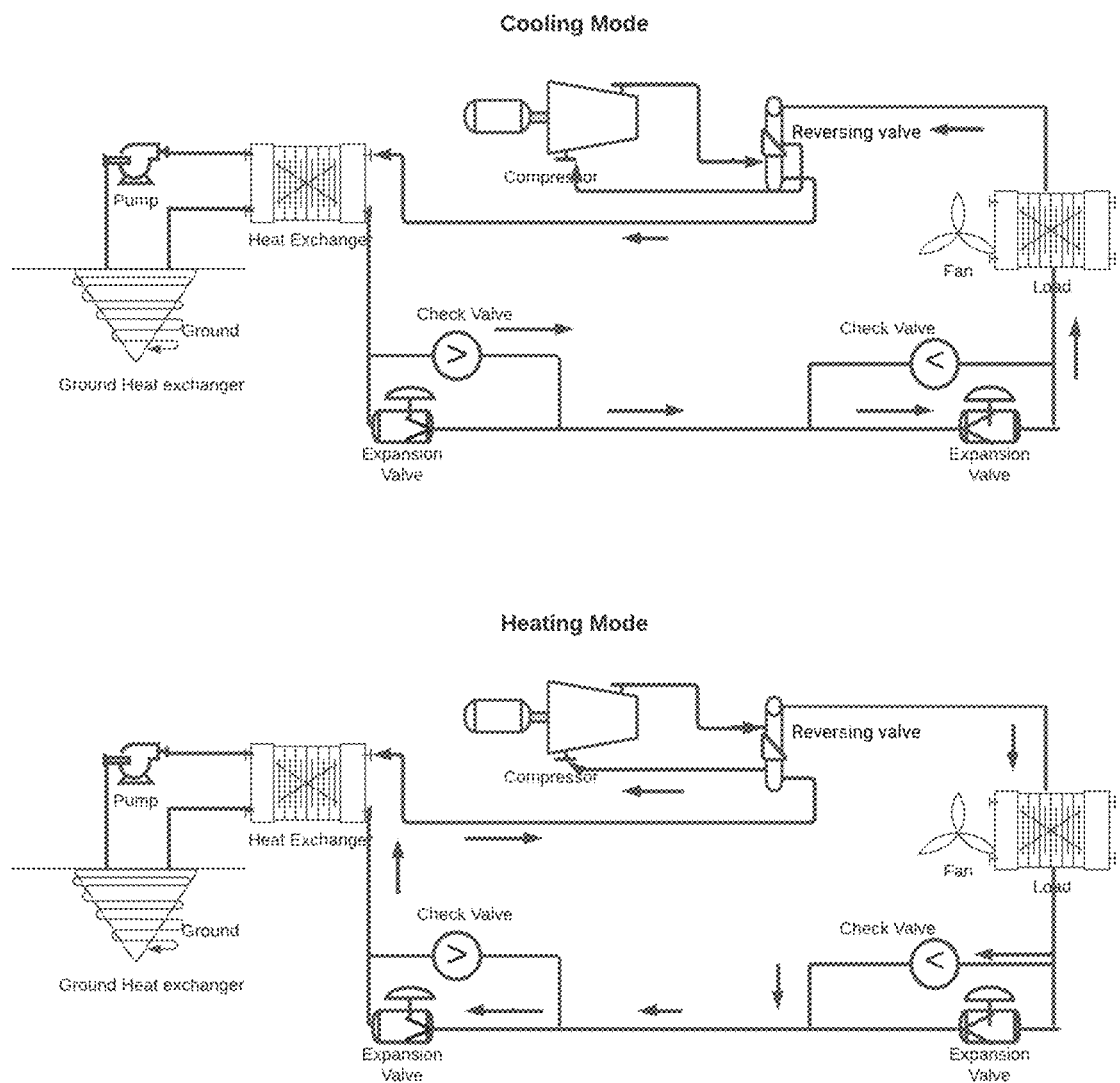
FIG. 11 is a schematic view of a geothermal heating and cooling system for geothermal heating and/or cooling of a space employing a one-piece, unitarily formed compact geothermal heat exchanger in accordance with further aspects of an embodiment of the invention and showing operation in both cooling and heating modes.

Working fluid inlet 110 and working fluid outlet 112 of heat exchanger 100 may be connected to a geothermal heating and cooling system for geothermal heating and/or cooling of a space, as shown schematically in FIG. 11.

Figure 3:
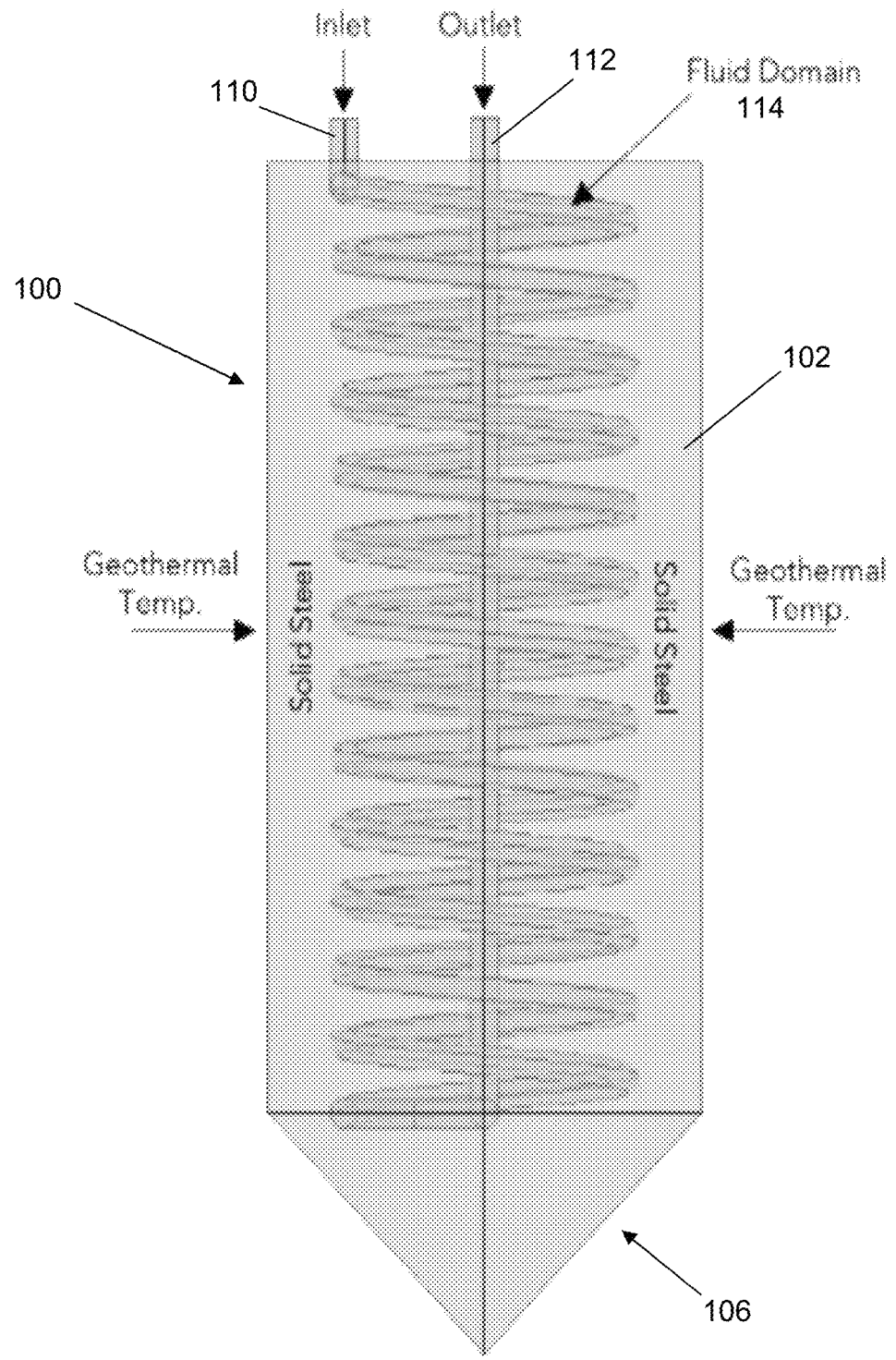
FIG. 3 is a side view of the one-piece, unitarily formed compact geothermal heat exchanger of FIG. 1 showing an internal working fluid flow channel in phantom.
Figure 4:
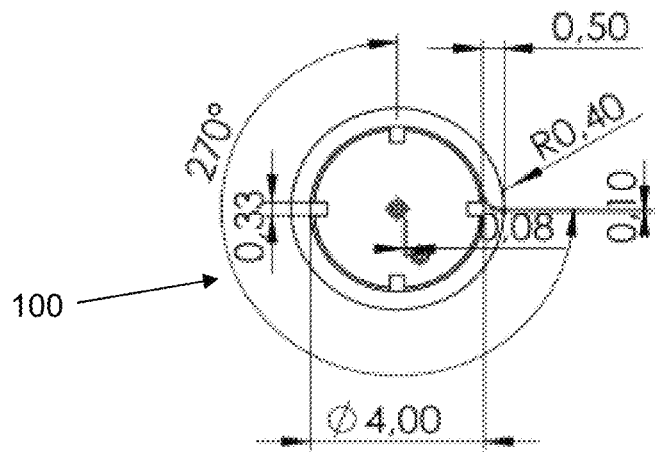
FIGS. 4-7 are top, front, side, and bottom views, respectively, of the one-piece, unitarily formed compact geothermal heat exchanger of FIG. 1 including exemplary dimensions for a small-scale prototype unit of the one-piece, unitarily formed compact geothermal heat exchanger of FIG. 1 (all dimensions shown being in inches).
Figure 5:
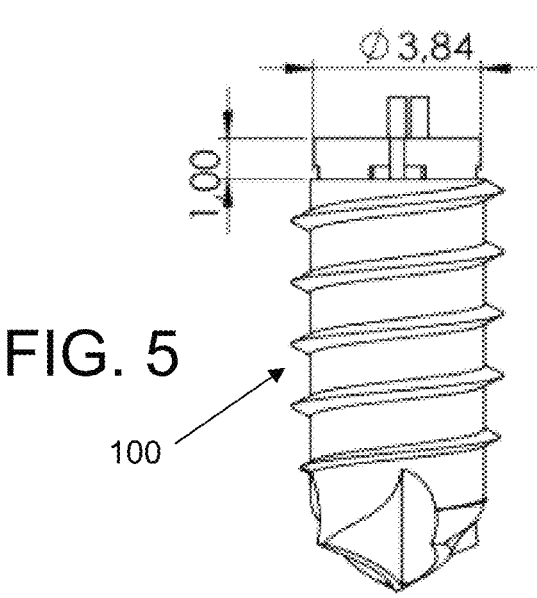
Figure 6:
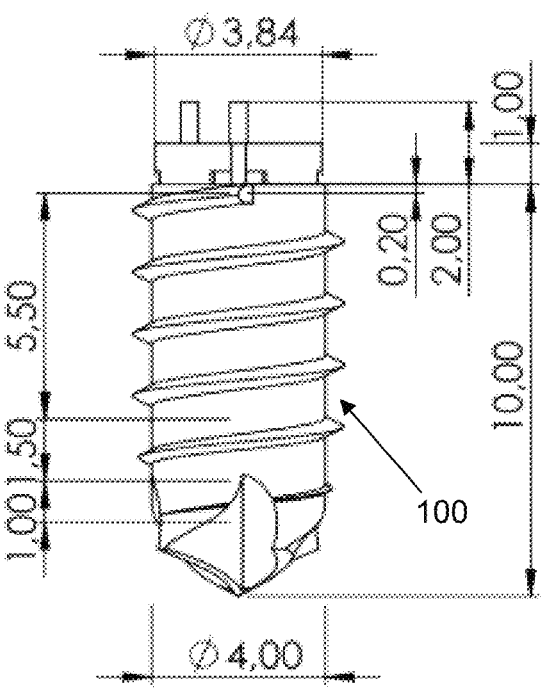
Figure 7:
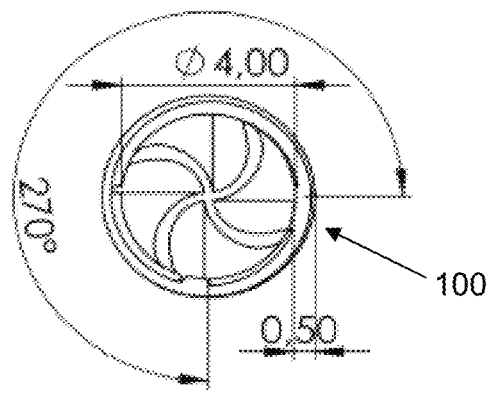

FIG. 3 provides a simplified view of the working fluid flow channel 114 inside of unitary, single-body shaft 102. In the simplified view of heat exchanger 100 of FIG. 3 (in which external details of the body shaft 102, helical threads 104, and cutting tip 106 are not shown for clarity), heat exchanger 100 includes an outer cylindrical shell formed by unitary single-body shaft 102 and internal helical and spiral working fluid flow channel 114. More particularly, working fluid flow channel 114 comprises a helical and spiral winding hollow space inside of single-body shaft 102, extending from inlet 110, spiraling downward toward cutting tip 106 at the bottom of shaft 102, and from there extending vertically upward through the center of flow channel 114 to outlet 112. In this configuration, heat exchanger 100 is formed as a single, unitary piece of solid steel formed from an additive manufacturing process (discussed in detail below), with the working fluid flow channel 114 simply formed by the internal, helical void inside of shaft 102. In operation, the working fluid (e.g., water or other heat exchange fluid) flows from the inlet, downward through the spiral flow channel 114 inside of heat exchanger 100, then upward through the middle of shaft 102 to outlet 112. Inlet 110 and outlet 112 may in turn be connected to fluid conduits that extend between heat exchanger 100 and a heat pump inside of an enclosed space, which heat pump is in turn configured for temperature conditioning of that enclosed space to a desired temperature, which heat pump systems are well known to those of ordinary skill in the art and thus not further detailed here.

A heat exchanger 100 formed in accordance with the foregoing description may avoid the difficulties presented by the complex installation process and large space requirements of currently known in-ground geothermal heat exchangers as part of a geothermal heating and cooling system. A heat exchange 100 formed as discussed herein via an additive manufacturing process may be integrated with conventional geothermal heating and cooling systems for improved efficiency and easy installation. Such an additively manufactured heat exchanger 100 eliminates the need to excavate the soil and install long piping as has be conventionally required in prior known geothermal systems. Such an additively formed heat exchanger 100 may be formed using the direct metal laser sintering technique, and may be integrated with a heat pump of traditional configuration to exchange heat between a constant temperature water bath circulator and a water heat sink. Such an additively formed heat exchanger 100 is capable of operating in both geothermal heating and cooling modes, may perform its geothermal heat transfer functions in a more compact configuration than previously known geothermal heat exchangers (which both is easier to install and requires less physical space), and mitigates the risk of working fluid leakage into the ground due to its one-piece, unitary, solid steel construction, all leading to less maintenance and less operating costs during long-term operation.

Exemplary Implementation and System Performance Model

Following is a non-limiting exemplary embodiment of a heat exchanger incorporating certain aspects of the invention as described above. A prototype of heat exchanger 100 was produced through a direct metal laser sintering (DMLS) method, which builds metal parts from a CAD file using a laser source to selectively fuse fine metal powder. An EOSINT M280 type of DMLS machine was used at the University of the District of Columbia to print the 3D model. Such an EOSINT M280 machine can be used to seamlessly manufacture complex heat exchanger designs in order to improve performance and reduce weight while limiting the number of components required for the final product, as well as meeting conformal geometries for space-limited applications.

The proposed heat exchanger was made up of Maraging Steel MS1 powder. Maraging steels have a unique combination of features for materials that are printed from 3D technology. High strength, high fracture toughness, good weldability, and dimensional stability during aging are some features of Maraging steels. Due to those promising properties, Maraging steels are used extensively in high-performance industrial and engineering parts such as aerospace and motor racing applications. Table 1 below shows the operating conditions of the machine to fabricate the 3D model of the prototype heat exchanger 100.

TABLE 1

Conditions and materials applied to EOSINT M280 machine to generate prototype heat exchanger

| Fabrication Requirement | EOS280 Operating Mode |
| --- | --- |
| Metal Powder | EOS Maraging Steel MS1 |
| Process Gas | Nitrogen |
| Laser Power | 400 W |
| Layer Thickness | 40 micrometer |
| Software | EOSTATE Magics RP (materialize) |
| CAD Interface | CREO, SolidWorks (STL file form) |

The prototype of the heat exchanger 100 was built in the vertical orientation and a solid support structure was projected onto the build plate to act as a foundation. The STL file of the model developed by CREO was then imported into Materialise Magics software for fixing errors, editing the design, and preparing the platform. The Materialise Magics software is a tool that helps to guide on issues such as best part orientation and support generation. Once the file preparation was completed, the file was exported to the EOSINT M280 laser-based powder bed fusion system for printing.

In the design procedure of the prototype of ground-source heat exchanger 100, different considerations were taken into account in order to achieve the appropriate sizing of the system to make it thermodynamically and mechanically efficient. However, a tremendous emphasis was placed on a developing an approach that would enable easy installation of the proposed heat exchanger. Traditionally, groundsource heat exchangers are placed in the ground by removing the soil. However, a heat exchanger 100 configured in accordance with aspects of the invention employs a screw-type configuration, and is designed to be screwed into the ground without removal of the soil. FIGS. 4-7 depict different views of the exterior of the fabricated heat exchanger 100 with dimensions in a scaled-down prototype configuration suitable for testing of the thermodynamic properties of the invention. The internal working fluid flow channel 114 of the heat exchanger 100 was designed by combining helical and spiral contours. This design contributes to saving the building material (Maraging steel powder), decreasing the overall mass of the heat exchanger, and increasing the heat transfer surface area for the working fluid. The sizing of the heat exchanger 100 was determined by paying attention to both heat transfer considerations and manufacturing considerations. The heat transfer considerations were implemented by taking into account the amount of thermal load to be fitted for a building's space conditioning. Table 2 below lists the operating conditions used in the present study to specify the system sizing and analyze heat transfer performance, including thermal load, ground temperature, inlet water temperature, and desired outlet water temperature from the heat exchanger 100. Using these known parameters, an analytical approach was conducted to determine the required length of the heat exchanger channel. The working fluid flow channel's and helical coil's diameters were also chosen based on manufacturing considerations, consisting of space limitations in design, technical difficulties in additive manufacturing of the device, and the other considerations, which are employed to produce a compact heat exchanger with easy and cost-effective installation in the ground with a minimal space to be occupied.

TABLE 2

Operating conditions used to determine sizing and analyze heat transfer performance

| Operation Conditions | Heating Mode | Cooling Mode |
|---|---|---|
| Working Fluid | Water | Water |
| Thermal Load | 1450 W | 1450 W |
| Mass Flow Rate | 0.029 kg/s | 0029 kg/s |
| Ground Temperature | 15° C. | 15° C. |
| Inlet Temperature | 1° C. | 32° C. |
| Outlet Temperature | 13° C. | 20° C. |

The following analytical approach is implemented to determine the system sizing, including the length of channel and heat transfer area while the channel's and helical coil's diameters are chosen based on manufacturing considerations as stated above.

The assumptions adopted to analyze the heat transfer performance of heat exchanger 100, either analytically or numerically, are as follows:

i) Quasi-steady state condition is maintained within operation of the heat exchanger;

ii) Thermal conductivity and specific heat of the materials remain constant at average temperature of inlet and outlet; and iii) The ground temperature is taken constant, and temperature on the exterior surface of the heat exchanger is assumed uniform at the constant temperature of the ground (i.e. uniform wall temperature boundary conditions).

Using the energy balance for sensible heat exchange of a liquid single-phase flow, the mass flow rate of water can be simply calculated by having known values of thermal load, inlet and outlet temperatures:

$$\dot{Q} = \dot{m} C_p |(T_{out} - T_{in})| \quad (1)$$

After having the mass flow rate calculated, the flow regime is identified to be whether laminar or turbulent by calculating the Reynolds number expressed below and then comparing it with the critical Reynolds (i.e., $Re_{cr} = 2300$):

$$Re = \frac{4\dot{m}}{\pi d_i \mu_w} \quad (2)$$

According to the Newton's cooling law, the overall heat transfer coefficient (UA) can be calculated:

$$\dot{Q} = UA \Delta T_{lm} \quad (3)$$

where UA stands for the overall heat transfer coefficient by convection of the working fluid and conduction of the wall thickness, and $\Delta T_{lm}$ accounts for the logarithmic mean temperature difference (LMTD) which is defined for uniform wall temperature conditions as follows:

$$\Delta T_{lm} = \frac{T_{out} - T_{in}}{\ln\left(\frac{T_{wall} - T_{in}}{T_{wall} - T_{out}}\right)}$$

The overall heat transfer coefficient, in turn, can be expressed in terms of convective and conductive thermal resistances as follows:

$$UA = \frac{1}{R_{tot}} = \frac{1}{R_{conv} + R_{cond}} = \frac{1}{\frac{1}{h \times A} + \left(\frac{\ln\left(\frac{d_o}{d_i}\right)}{2\pi L K_s}\right)} \quad (4)$$

in which heat transfer coefficient (h), length of the channel (L), and surface area (A) are still unknown.

Nusselt number is then expressed for a circular channel as below:

$$Nu_{exp} = \frac{h d_i}{K_w} \quad (5)$$

where $Nu_{exp}$ stands for the Nusselt number derived from the well-recognized experimental correlations available in the literature for helically coiled tubes.

Table 3 below lists two empirical Nusselt correlations used in the present study to estimate and compare heat transfer coefficients for the operating conditions introduced earlier in Table 2.

TABLE 3

Empirical correlations of Nusselt number for helically coiled tubes with their validity ranges.

| Authors (Year) | Validity Ranges (geometry in mm) | Correlations | Boundary Conditions |
|---|---|---|---|
| Pawar and Vivek (2013) [17] | D/d = 13.2, 15.6, 18.2; d = 20.8; p = 29.15; | Nu = 0:0472 $Dn^{0.8346}(Pr)^{0.4}$ where $Dn = Re(\sqrt{d/D})$ | Constant wall temperature, based on average liquid |

TABLE 3-continued

Empirical correlations of Nusselt number for helically coiled tubes with their validity ranges.

| Authors (Year) | Validity Ranges (geometry in mm) | Correlations | Boundary Conditions |
|---|---|---|---|
| | t = 2.3; L = 8195, 9688, 11180 D = 287.3, 337.3, 387.3 Dn = 586-4773 Pr = 3.83-7.3 | | bulk temperature and average wall temperature |
| Xin and Ebadian (1997) [18] | D/d = 11.3-37.5; d = 10.16, 22.9; L = 5500; p = 62.5, 76.325, 381; t = 1.27; D = 127, 259, 381 Dn = 20-2000; Pr = 0.7-175 | $Nu = (2.153 + 0.318\ Dn^{0.643})(Pr)^{0.177}$ where $Dn = Re(\sqrt{d/D})$ | Constant wall heat flux, based on peripheral average and local bulk temperature |
| | 5000 < Re < 100000 Pr = 0.7-175 | $Nu = 0.00619(Re)^{0.92}(Pr)^{0.4}\left(1 + 3.455\dfrac{d}{D}\right)$ | Constant wall temperature |

Considering Eqs. (1)-(5) coupled with either of the empirical Nusselt correlations shown in Table 3, there is a system of six nonlinear equations which is solved by developing a code in Engineering Equation Solver (EES) to obtain six unknowns, including ni, Re, UA, h, Nu, and L. After computing the above, Table 4 below concludes the system sizing for the length of the helically coiled channel, inner diameter of the channel, and diameter of the helical coil.

TABLE 4

System sizing with dimensions of channel and helical coil

| Dimensions | Value |
|---|---|
| Inner Diameter of the Channel | 6.35 mm |
| Diameter of the Helical Coil | 96.52 mm |
| Length of the Channel | 5 m |

The heat transfer performance of the heat exchanger analyzed as above was evaluated, the results of which analysis are reported in Gemeda, Takele et al., "Design and Development of a Novel Additively Manufactured Geothermal Heat Exchanger," Center for Advanced Manufacturing in Space Technology & Applied Research (CAM-STAR), University of the District of Columbia, Washington, D.C (2020), the specification of which is incorporated herein by reference.

The prototype heat exchanger described above and shown in FIGS. 1-3 was designed using CREO software, after which the model was imported to COMSOL-Multiphysics to conduct numerical analysis.

Three types of meshes were developed in the present study to analyze the simulation, including finer, fine, and normal. The size settings for each mesh are shown in Table 5 below. Comparing the maximum velocities of the fluid flow in the middle of the channel demonstrated that the three velocity profiles were close, especially with the finer and fine meshes. The fine mesh size was eventually chosen as it allows one to conduct a detailed analysis while still maintaining a reasonable computational time.

TABLE 5

Mesh types developed to conduct simulation

| Description | Finer | Fine | Normal |
|---|---|---|---|
| Calibrate for | Fluid dynamics | Fluid dynaimcs | Fluid dynamics |
| Maximum element size | 0.148 | 0.212 | 0.4 |
| Minimum element size | 0.016 | 0.04 | 0.12 |
| Curvature factor | 0.4 | 0.5 | 0.7 |
| Resolution of narrow regions | 0.9 | 0.8 | 0.6 |
| Maximum element growth rate | 1.4 | 1.13 | 1.2 |
| Maximum velocity value | 0.0197 | 0.0195 | 0.0187 |
| Computational time | 24 min 27 sec | 6 min 21 sec | 2 min 46 sec |

The following assumptions were adopted to conduct the simulation: no slip boundary condition, normal inflow velocity, constant ground temperature boundary conditions, negligible gravity, and thermophysical properties of the materials are set to remain constant at average temperature of inlet and outlet as listed in Table 6 below.

TABLE 6

Thermophysical properties of the materials to develop simulation

| | |
|---|---|
| Thermal conductivity of EOS MaragingSteel MS1 | 15 W/m° C. |
| Specific heat capacity EOS MaragingSteel MS1 | 450 J/kg° C. |
| Density EOS MaragingSteel MS1 | 8 g/cm³ |
| Thermal conductivity of water | 0.6 W/m° C. |
| Specific heat capacity of water | 4200 J/kg° C. |
| Density of water | 997 kg/m³ |

Figure 8:
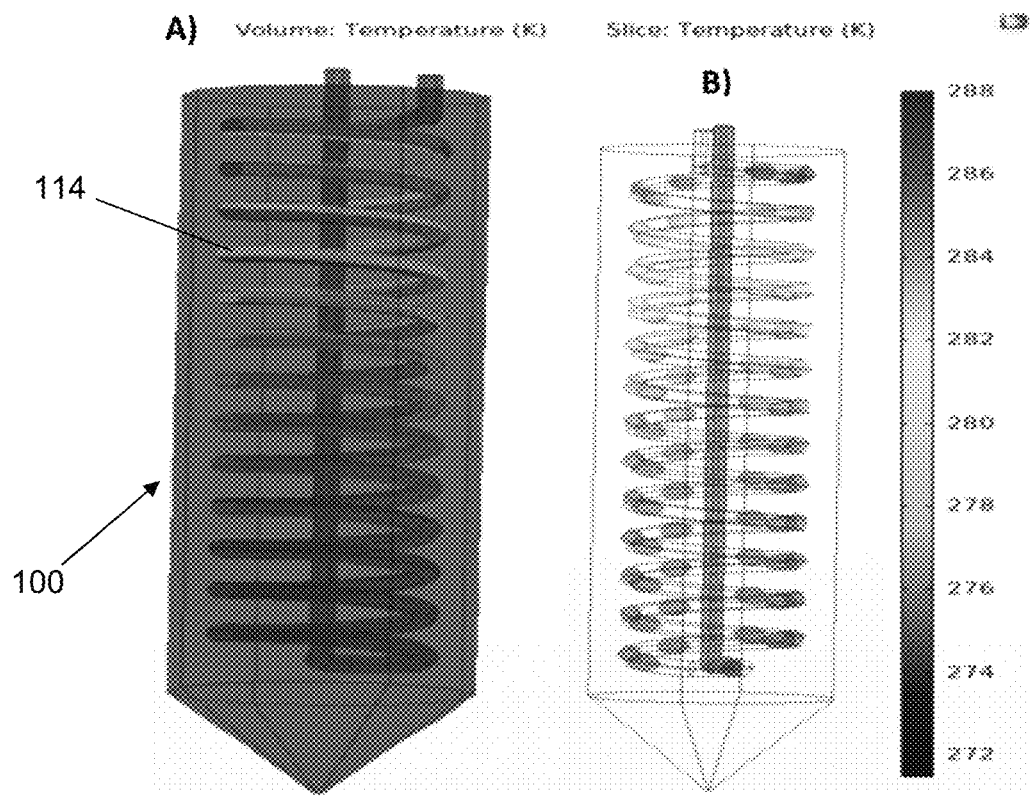
FIG. 8 is a schematic view of simulated heating of working fluid passing through a one-piece, unitarily formed compact geothermal heat exchange formed in accordance with aspects of the invention.

FIG. 8 shows temperature distribution of the working fluid for the heating scenario with the operating conditions and geometry introduced in Tables 2 and 4, respectively. As represented in simulation results, the bulk temperature of water increases gradually from the inlet temperature of 1 C (274 K) to the outlet temperature of 13 C (287 K) as a result of heat acquisition supplied by the ground with a higher constant temperature of 15 C (288 K), indicating a temperature increase of nearly 12 C in the heating mode based on the current design of heat exchanger 100.

Figure 9:
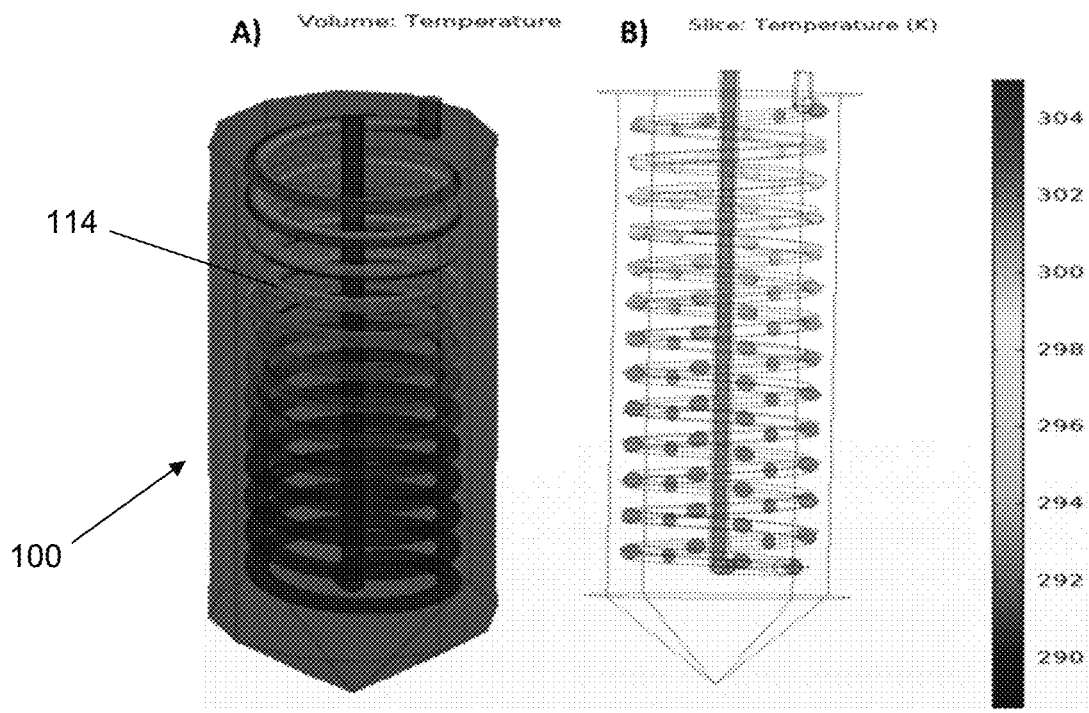
FIG. 9 is a schematic view of simulated cooling of working fluid passing through a one-piece, unitarily formed compact geothermal heat exchange formed in accordance with aspects of the invention.

Similarly, FIG. 9 represents temperature distribution of the working fluid for the cooling scenario with the operating conditions and geometry introduced in Tables 2 and 4, respectively. As illustrated in simulation results, the bulk temperature of water decreases gradually from the inlet temperature of 32 C (305K) to the outlet temperature of 20 C (293 K) as a result of heat rejection to the ground with a lower constant temperature of 15 C (288 K), indicating a temperature reduction of virtually 12 C in the cooling mode based on the current design of heat exchanger 100.

Figure 10:
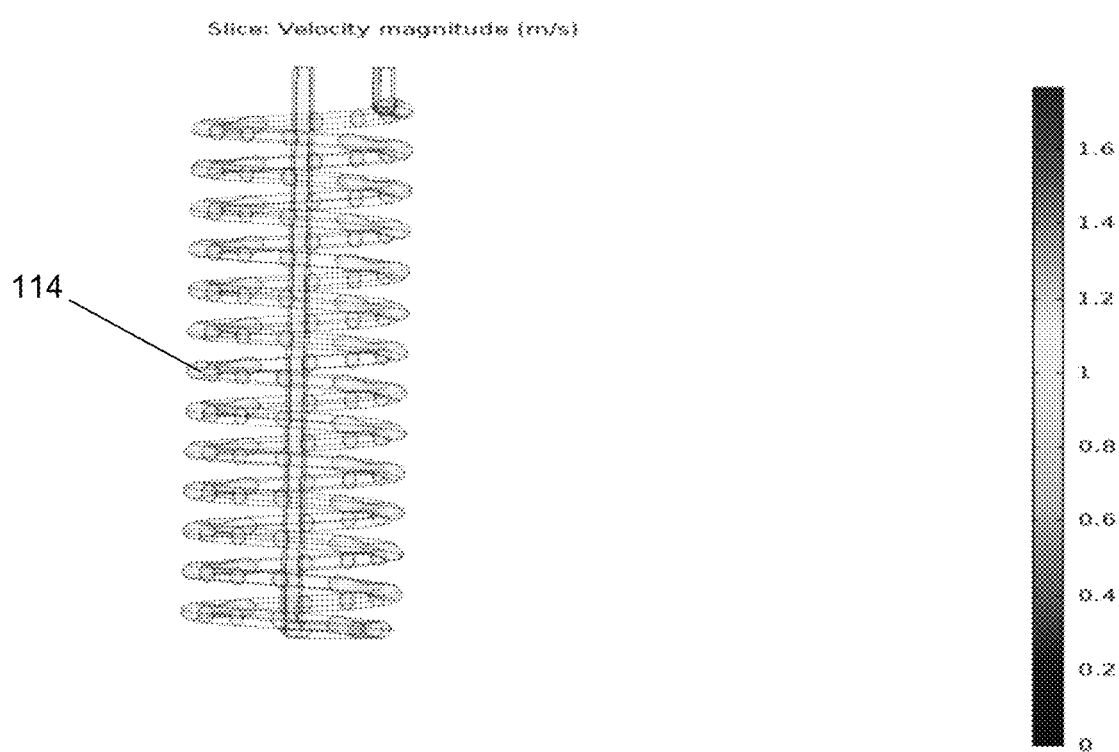
FIG. 10 is a schematic view of simulated velocity magnitude of working fluid passing through a one-piece, unitarily formed compact geothermal heat exchange formed in accordance with aspects of the invention.

Further, FIG. 10 shows velocity distribution of the working fluid flowing through the internal working fluid channel 114. As clearly represented in this figure, the fluid velocity fluctuates between almost 0.9 m/s and 1.1 m/s along the channel while the analytical calculation of the fluid's mean velocity is found to be nearly 0.93 m/s for the operating conditions and geometry addressed earlier in Tables 2 and 4, respectively.

Such results show that an additively manufactured ground-source heat exchanger for geothermal systems configured in accordance with aspects of the invention may help to eliminate the need of excavating the ground during installation while maintaining an efficient heat exchanger ready for inclusion in conventional geothermal heating and cooling systems. Such a heat exchanger provides a more compact configuration than previously known systems, and mitigates the risk of working fluid leakage into the ground, leading to less maintenance and less operating costs during long-term operation.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A geothermal heat exchanger, comprising:
 a unitary, single body shaft configured for threaded engagement with a section of ground material, said shaft having a helical, open fluid conduit extending downward through an interior of said body shaft from a top end of said shaft and back upward to said top end of said shaft;
 wherein said fluid conduit of said geothermal heat exchanger is configured for fluid communication with a working heat transfer fluid flowing through a geothermal heating and cooling system;
 wherein said single body shaft comprises a plurality of helical threads on an exterior of the shaft;
 wherein said single body shaft comprises a one-piece, unitary compact geothermal heat exchanger body; and
 wherein said helical, open fluid conduit comprises a continuous spiral channel extending from a working heat transfer fluid inlet downward through said single body shaft and then upward to a working heat transfer fluid outlet, wherein said continuous spiral channel is defined by interior walls of said single body shaft without separate internal components; and
 wherein said single body shaft comprises a solid metal body having said helical, open fluid conduit formed therein, wherein said helical threads on said exterior of the shaft are configured to enable direct threaded engagement with ground material during installation.

2. The geothermal heat exchanger of claim 1, said single body shaft further comprising a plurality of helical threads on an exterior of the shaft.

3. The geothermal heat exchanger of claim 2, said single body shaft further comprising a cutting tip at a bottom end of the shaft.

4. The geothermal heat exchanger of claim 3, wherein said helical threads extend from said cutting tip to the top end of said shaft.

5. The geothermal heat exchanger of claim 1, said single body shaft further comprising said working heat transfer fluid inlet in the top end of the shaft, and said working heat transfer fluid outlet in the top end of the shaft, wherein said working heat transfer fluid inlet and outlet are integrally formed within said solid metal body.

6. The geothermal heat exchanger of claim 5, wherein each of said working heat transfer fluid inlet and said working heat transfer fluid outlet is in fluid communication with said continuous spiral channel defined by said interior walls of said single body shaft.

7. The geothermal heat exchanger of claim 6, wherein each of said working heat transfer fluid inlet and said working heat transfer fluid outlet is configured for direct attachment to fluid conduits carrying said working heat transfer fluid between said geothermal heat exchanger and a portion of said geothermal heating and cooling system.

8. A geothermal heating and cooling system, comprising:
 a heat pump configured for temperature conditioning of an enclosed space to a desired temperature;
 a geothermal heat exchanger; and
 fluid conduits extending between the heat pump and the geothermal heat exchanger to enable heat transfer between the geothermal heat exchanger and the heat pump;
 the geothermal heat exchanger further comprising:
  a unitary, single body shaft configured for threaded engagement with a section of ground material, said shaft having a helical, open fluid conduit extending downward through an interior of said body shaft from a top end of said shaft and back upward to said top end of said shaft;
  wherein said fluid conduit of said geothermal heat exchanger is in fluid communication with said fluid conduits extending between the heat pump and the geothermal heat exchanger to enable fluid communication of a working heat transfer fluid between said fluid conduit of said heat exchanger and said heat pump;
  wherein said single body shaft comprises a one-piece, unitary compact geothermal heat exchanger body;
  wherein said helical, open fluid conduit comprises a continuous spiral channel extending from a working heat transfer fluid inlet downward through said single body shaft and then upward to a working heat transfer fluid outlet, wherein said continuous spiral channel is defined by interior walls of said single body shaft without separate internal components; and
  wherein said single body shaft comprises a solid metal body having said helical, open fluid conduit formed therein, wherein said helical threads on said exterior of the shaft are configured to enable direct threaded engagement with ground material during installation.

9. The geothermal heating and cooling system of claim 8, wherein said working heat transfer fluid inlet and said working heat transfer fluid outlet are in fluid communication with said fluid conduits.

10. The geothermal heating and cooling system of claim 8, said single body shaft further comprising a plurality of helical threads on an exterior of the shaft.

11. The geothermal heating and cooling system of claim 10, said single body shaft further comprising a cutting tip at a bottom end of the shaft.

12. The geothermal heat exchanger of claim 11, wherein said helical threads extend from said cutting tip to the top end of said shaft.

13. A method of forming a geothermal heating and cooling system, comprising the steps of:
   providing a geothermal heat exchanger comprising:
      a unitary, single body shaft configured for threaded engagement with a section of ground material, said shaft having a helical, open fluid conduit extending downward through an interior of said body shaft from a top end of said shaft and back upward to said top end of said shaft;
      wherein said fluid conduit of said geothermal heat exchanger is configured for fluid communication with a working heat transfer fluid flowing through a geothermal heating and cooling system;
      wherein said single body shaft is formed as comprises a one-piece, unitary compact geothermal heat exchanger body:
      wherein said helical, open fluid conduit comprises a continuous spiral channel extending from a working heat transfer fluid inlet downward through said single body shaft and then upward to a working heat transfer fluid outlet, wherein said continuous spiral channel is defined by interior walls of said single body shaft without separate internal components; and
   wherein said single body shaft comprises a solid metail body having said helical, open fluid conduit formed therein, wherein said helical threads on said exterior of the shaft are configured to enable direct threaded engagement with ground materials during installation;
   screwing said geothermal heat exchanger into ground material without predrilling; and
   placing said fluid conduit of said geothermal heat exchanger in fluid communication with a heat pump configured for temperature conditioning of an enclosed space to a desired temperature.

14. The method of forming a geothermal heating and cooling system of claim 13, said single body shaft further comprising a plurality of helical threads on an exterior of the shaft.

15. The geothermal heating and cooling system of claim 14, said single body shaft further comprising a cutting tip at a bottom end of the shaft.

16. The geothermal heat exchanger of claim 15, wherein said helical threads extend from said cutting tip to the top end of said shaft.

\* \* \* \* \*